United States Patent Office 2,901,519
Patented Aug. 25, 1959

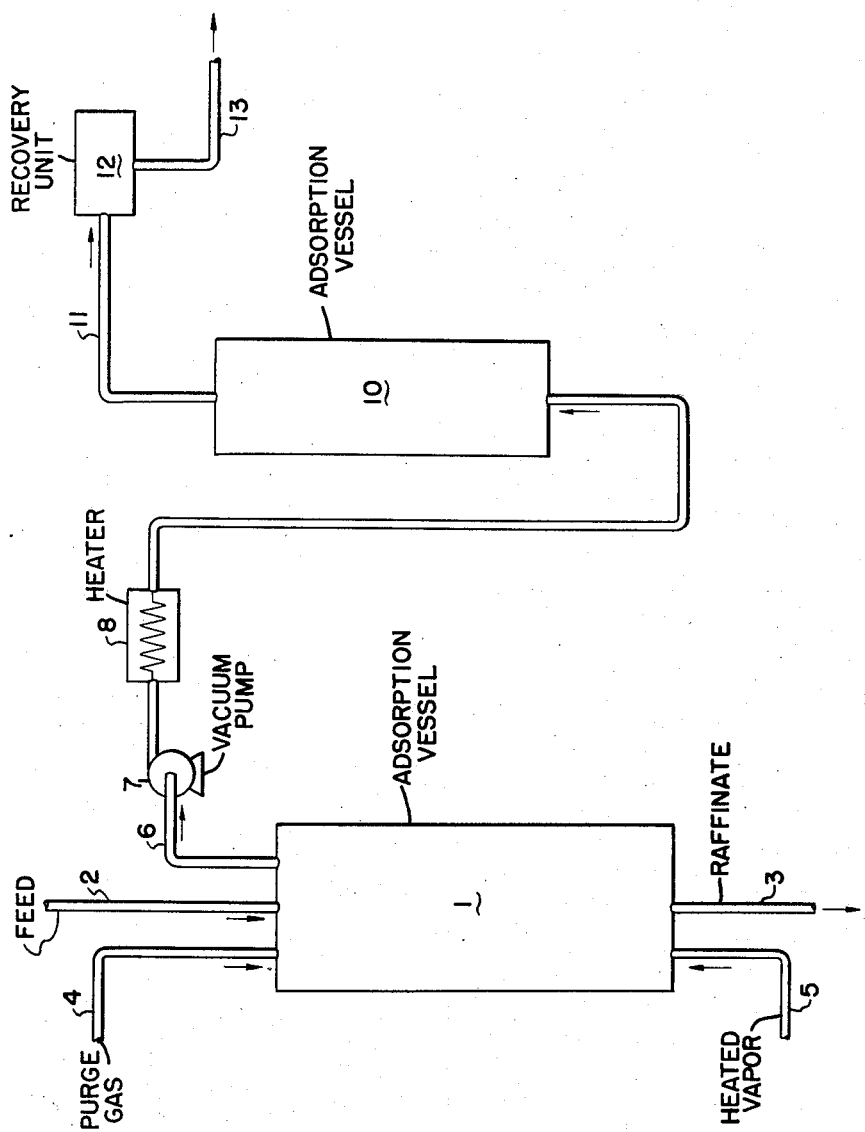

2,901,519

MOLECULAR SIEVE SEPARATION PROCESS

Albert C. Patterson, Westfield, and Homer Z. Martin, Cranford, N.J., assignors to Esso Research and Engineering Company, a corporation of Delaware Application April 29, 1957, Serial No. 655,695

4 Claims. (Cl. 260—676)

The present invention is concerned with an improved process for the separation and segregation of straight chain hydrocarbons from mixtures comprising branched chain hydrocarbons and/or cyclic or aromatic hydrocarbons. The invention is more particularly concerned with a method of approaching an isothermal operation of a molecular sieve separation process including both the adsorption stage and the desorption stage. In accordance with the present process, the paraffin hydrocarbons are more efficiently adsorbed on the sieve and likewise more efficiently desorbed from the sieve.

It has been known for some time that certain zeolites, both naturally-occuring and synthetic, have the property of separating normal from isomeric branch chained hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3–5 Angstrom units to 12–15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $$(CaNa_2)Al_2Si_4O_{12} \cdot 2H_2O.$$

Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e., the ability to adsorb a straight-chain hydrocarbon and exclude the branch chain isomers, are described in an article "Molecular Sieve Action of Solids" appearing in Quarterly Reviews, Vol. III, pp. 293–330 (1949) and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl susbstituent makes for better detergency characteristics than a branch chained substituent of the same number of carbon atoms. Many other examples may be cited.

In the separation or removal of straight chain hydrocarbons from mixtures containing the same, a considerable amount of heat is evolved during the adsorption cycle which normally causes the temperature of the bed to rise appreciably. This is undesirable since at higher temperatures the sieve will hold a smaller amount of the normal paraffins than at the lower temperatures. Thus, for any given amount of paraffins to be removed, a greater quantity of sieves will be required, thereby appreciably increasing the cost.

After this sieve material is completely filled with normal paraffins to its saturation point, the feed is discontinued and a small amount of purge gas is introduced in order to sweep out the remaining feed hydrocarbons from the space between the sieve particles. After the purging step, several alternative procedures are available for recovering the normal paraffins from the sieve. For example, the pressure may be reduced below the pressure utilized during the adsorption stage. As the pressure is reduced, the normal paraffins vaporize from within the pores of the sieve and are removed as vapors from the adsorption vessel. During this stage of the operation, there exists a tendency for the temperature of the bed to fall. This is also undesirable since for any given drop in pressure, a smaller amount of the normal paraffins will be removed from the sieve at a lower temperature as compared to a higher temperature.

In accordance with the present invention, the disadvantages mentioned above are overcome. The present invention will be specifically described in conjunction with the drawing illustrating one adaptation of the same. Referring specifically to the drawing, a reaction vessel is filled in any suitable manner with a molecular sieve adsorptive material. A feed stream comprising a mixture of paraffins and non-paraffins is introduced into vessel 1 by means of feed line 2. In accordance with the present invention, this feed stream in the early stage of the adsorptive cycle is partially vaporized, i.e. it comprises a mixture of vapors and liquid. By operating in this manner, it is possible to introduce the feed at a lower temperature than if the feed were completely vaporized. The sensible heat picked up by the liquid feed adsorbs a considerable quantity of the heat of adsorption of the normal paraffins. In addition, the heat of vaporization of the liquid portion also picks up a considerable quantity of the heat of adsorption thereby tending to maintain an isothermal condition in the bed. Raffinate is withdrawn from zone 1 by means of line 3 and handled in any manner desirable.

A particularly desirable adaptation of the present process is to cut off the mixed feed toward the end of the adsorption cycle and continue to the end of the adsorption cycle with a completely dry feed, i.e. with feed that is entirely in the vapor phase. By operating in this manner, liquid which has wet the outside of the molecular sieve material, is vaporized, thereby drying the material. This is very desirable since it avoids a decrease in the selectivity of the molecular sieve adsorbent that would otherwise be the case if the mixed feed were introduced throughout the entire cycle.

At the end of the cycle when the adsorbent has become saturated, a purge gas is introduced by means of line 4 in order to remove feed material from between the sieve particles. This purge gas along with the residue feed particles is removed from adsorption vessel 1 by means of line 3. Normally, the adsorption cycle is run at a temperature in the range from about 200° to 600° F. and at a pressure from atmospheric to 100 p.s.i.g.

At the beginning of the desorption cycle, it is preferred to introduce a heated stream of normal paraffins into vessel 1 by means of line 5. By sufficiently preheating these vapors, it is possible, if desired, to raise the temperature of the bed and to carry out the desorption at a temperature considerably higher than if only a vacuum had been pulled on the bed. These vapors are removed by means of line 6. While the invention is primarily concerned with desorption by using reduced pressure under certain operation, it may be desirable to raise the temperature of the bed to within the range of from about 500° to 700° F. A vacuum is then pulled on the bed by means of pump 7, thereby causing the paraffins on the sieve to vaporize and to be withdrawn through line 6.

A particular feature of the present invention is to utilize a plurality of vessels, such as 1 and 10 operating at varying pressures during the desorption cycle. Thus, in operation when vessel 1 is first brought on the desorption part of the cycle, the pressure is lowered only part way to the ultimate desired low pressure. Hot normal paraffin vapors are introduced to vessel 1 by means of line 5 and withdrawn through line 6. These vapors are reheated in a heater 8 and introduced into a second bed of sieve material in vessel 10 which is in the latter stages of the desorption cycle. The reheated vapors pass through the second and lower pressure vessel. Heat economy is realized by using the hot effluent from vessel 1 to desorb the normal paraffins from vessel 10. In addition, the tendency of the temperature to decrease as pressure is decreased is less because the pressure is dropped only part way in each step. The vapors are withdrawn from vessel 10 by means of line 11 and pass to a recovery unit 12 wherein they are condensed and removed by means of line 13. These condensed hydrocarbons may be utilized as desired. While the system has been described with respect to two adsorption vessels, it is to be understood that additionaal vessels may be employed at additional pressure levels or pressure level increments may be used.

For simplicity of description, only necessary piping is shown. It is to be understood that in a commercial installation all necessary piping and manifolding for switching the vessels from an adsorption cycle to a desorption cycle, and thence to a second lower pressure desorption cycle, will be necessary. This, of course, is evident and understood by those skilled in the art.

The present invention may be more fully understood by the following example:

*Example*

When recovering normal hexane from admixture with other hydrocarbons, the sieve can be operated at about 600° F., the adsorption being at about atmospheric pressure. At these conditions about 6 wt. percent of normal hexane is adsorbed on the 5A sieve. The first step of desorption can be down to about 50 to 80 mm. pressure and the second one down to about 10 to 20 mm. pressure. At 50 mm. pressure, about half of the 6.5 grams per 100 grams of normal hexane is removed from the sieve. In the second stage, which is operated at about 10 to 15 mm., most of the remainder is removed.

The advantage of this system is that the vapors are reheated between the two stages without condensation and there is considerable saving in heat requirement for this reason.

As indicated earlier, it is also possible to operate at lower temperature during adsorption than during desorption. For example, by operating at 250° F. and atmospheric pressure, about 10 wt. percent of normal hexane can be adsorbed. The temperature can be held uniform at this level by using the technique disclosed herein i.e., charging partially vaporized feed stock. The temperature can then be increased to 600° F. by using a hot stream of normal paraffins, as described in the first example. If this is done with no decrease in pressure, about 40% of the normal paraffins will be desorbed. By decreasing pressure to 50 mm., as in the first example, and maintaining temperature, about 70% of the original adsorbate would be desorbed.

It is to be noted that in both examples, it is possible to approach isothermal operation within each cycle by the techniques described herein, whether or not the adsorption and desorption cycles are carried out at the same temperature level.

What is claimed is:

1. A process for separating straight chain hydrocarbons from non-straight chain hydrocarbons which comprises contacting a partially vaporized mixture of straight chain and non-straight chain hydrocarbons with a molecular sieve adsorbent selective for straight chain hydrocarbons, discontinuing said contacting before said adsorbent becomes saturated, contacting said adsorbent with an additional quantity of said mixture in vapor phase, and thereafter desorbing adsorbed straight chain hydrocarbons in at least two stages by reducing the pressure on said adsorbent.

2. A process as defined by claim 1 wherein said mixture is contacted with said adsorbent at temperatures between about 200 and about 600° F. and said straight chain hydrocarbons are desorbed at temperatures between about 500 and about 700° F.

3. A process as defined by claim 1 wherein the pressure on said adsorbent is reduced to an intermediate pressure below the adsorption pressure in a first desorption stage, preheated straight chain hydrocarbons are contacted with said adsorbent in said first desorption stage, the pressure on said adsorbent is reduced to a pressure below said intermediate pressure in a second desorption stage, and straight chain hydrocarbons recovered from said first desorption stage are heated and contacted with said adsorbent in said second desorption stage.

4. In a process wherein hydrocarbons are selectively adsorbed from a hydrocarbon mixture onto a molecular sieve adsorbent and are subsequently desorbed, the improvement which comprises commencing adsorption with said mixture in mixed liquid-vapor phase and completing adsorption with said mixture in vapor phase.

References Cited in the file of this patent

UNITED STATES PATENTS

| | | |
|---|---|---|
| 2,594,615 | Berg | Apr. 29, 1952 |
| 2,702,826 | Kirshenbaum et al. | Feb. 22, 1955 |
| 2,813,139 | Hutchings | Nov. 12, 1957 |
| 2,818,455 | Ballard et al. | Dec. 13, 1957 |